United States Patent
Lovell et al.

(10) Patent No.: US 6,754,967 B2
(45) Date of Patent: Jun. 29, 2004

(54) RECIPROCATING SAW HOLDER

(75) Inventors: Kelton W. Lovell, Baltimore, MD (US); Timothy T. McKenzie, Baltimore, MD (US); Jason Melvin, Towson, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/310,312

(22) Filed: Dec. 5, 2002

(65) Prior Publication Data

US 2003/0079353 A1 May 1, 2003

Related U.S. Application Data

(62) Division of application No. 09/636,374, filed on Aug. 11, 2000, now Pat. No. 6,546,633.

(51) Int. Cl.[7] ................................................. B23D 49/10
(52) U.S. Cl. ............................... 30/517; 279/81; 30/392
(58) Field of Search ......................... 30/517, 523, 339, 30/392; 81/489, 491; 279/81

(56) References Cited

U.S. PATENT DOCUMENTS

| 2,286,530 | A | 6/1942 | Fordon |
| 3,186,726 | A | 6/1965 | Wilhelm et al. |
| 3,461,732 | A | 8/1969 | Gregory |
| 3,583,716 | A | 6/1971 | Daniel, Jr. |
| 3,802,079 | A | 4/1974 | Ketchpel, Jr. et al. |
| 3,823,473 | A | 7/1974 | Hoffman |
| 4,083,112 | A | 4/1978 | Palm |
| D271,206 | S | 11/1983 | Devey |
| 4,601,477 | A | 7/1986 | Barrett et al. |
| 4,741,059 | A | 5/1988 | Lee et al. |
| 5,573,255 | A | * 11/1996 | Salpaka ..................... 30/392 X |
| 5,606,758 | A | 3/1997 | Tung |
| 5,987,758 | A | 11/1999 | McCurry et al. |
| 6,053,675 | A | 4/2000 | Holland et al. |
| 6,209,208 | B1 | 4/2001 | Marinkovich et al. |

FOREIGN PATENT DOCUMENTS

| DE | 3030855 A1 | 8/1980 |
| DE | 3536101 A1 | 10/1985 |
| DE | 29811783 U1 | 10/1998 |
| EP | 283269 A2 | 9/1988 |
| EP | 755313 B1 | 7/1999 |

* cited by examiner

*Primary Examiner*—Douglas D. Watts
(74) *Attorney, Agent, or Firm*—Harness, Dickey & Pierce, P.L.C.

(57) ABSTRACT

A reciprocating saw includes a saw blade that is connected to a hand held driver for reciprocating the saw blade to perform a cut. A bit holder and a blade holder is used to provide connection between the saw blade and the handle of the hand held driver. The bit holder includes connecting mechanism for connecting the bit holder to the hand held driver. The blade holder provides a connection between the saw blade and the bit holder. The blade holder includes a holder body and a hex-shaped shank extending rearwardly from the holder body. The shank further includes a first holding mechanism for coupling the holder to the bit holder at the rear end and a second holding mechanism for coupling the saw blade to the holder at the forward end.

6 Claims, 9 Drawing Sheets

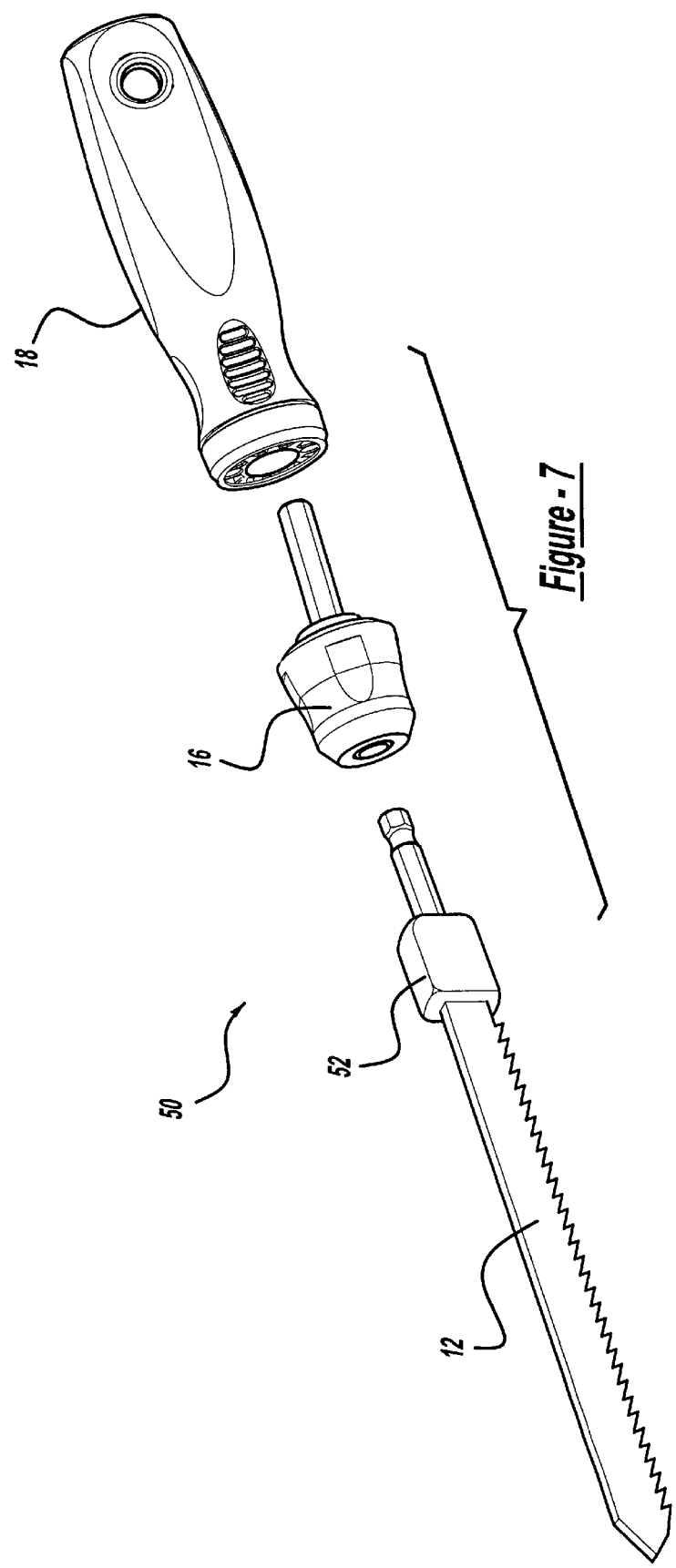

RECIPROCATING SAW HOLDER

CROSS-REFERENCE TO RELATED APPLICATIONS

This application is a divisional of U.S. patent application Ser. No. 09/636,374, filed on Aug. 11, 2000 now U.S. Pat. No. 6,546,633. The disclosure of the above application is incorporated herein by reference.

FIELD OF THE INVENTION

The present invention relates generally to reciprocating saws, and more particularly, to quick change reciprocating saws adapted for use in hand held drivers, within which operators are permitted to purposefully switch between several saw blades.

BACKGROUND OF THE INVENTION

Portable reciprocating saws, including a variety of handsaws and the like, have been generally known in the art for some time, handsaws being commonly used tools for performing a cut. Since there are different types of saw blades with different sizes, the operator has to have a number of different types of saw blades in order to perform a cut on various objects the operator may encounter. However, currently available handsaws have set blades that are cast around or fixedly attached to the handle by other methods, thus one blade cannot be switched to another when the operator needs different sizes or types of saw blades.

Therefore, it would be desirable to provide a reciprocating handsaw that allows the operator to easily and securably change from one saw blade to another when performing tasks that require more than one saw blade.

Moreover, it would be further desirable to provide a reciprocating handsaw that can be attached to readily available handles of hand held drivers which can also be interchanged with different types of bits to perform various functions.

SUMMARY OF THE INVENTION

In accordance with the present invention, a reciprocating saw includes a saw blade that is connected to a hand held driver for reciprocating the saw to perform a cut. A bit holder and a blade holder is used to provide connection between the saw blade and the handle of the hand held driver. The bit holder includes a connecting mechanism for connecting the blade holder to the hand held driver. The blade holder provides a connection between the saw blade and the bit holder. The blade holder includes a holder body and a hex-shaped shank extending rearwardly from the holder body. The shank further includes a first holding mechanism for coupling the holder to the bit holder at the rear end and a second holding mechanism for coupling a saw blade to the holder at the forward end.

Further areas of applicability of the present invention will become apparent from the detailed description given hereinafter. It should be understood however that the detailed description and specific examples, while indicating preferred embodiments of the invention are intended for purposes of illustration only, since various changes and modifications within the spirit and scope of the invention will become apparent to those skilled in the art from the following detailed description.

BRIEF DESCRIPTION OF THE DRAWINGS

The present invention will become more fully understood from the following detailed description and the accompanying drawings, in which:

FIG. 7 is an exploded perspective view of the reciprocating saw having a die cast blade holder, adapted for use in the hand held driver according to a fifth embodiment of the present invention;

DETAILED DESCRIPTION OF THE PREFERRED EMBODIMENT

Figure 1:
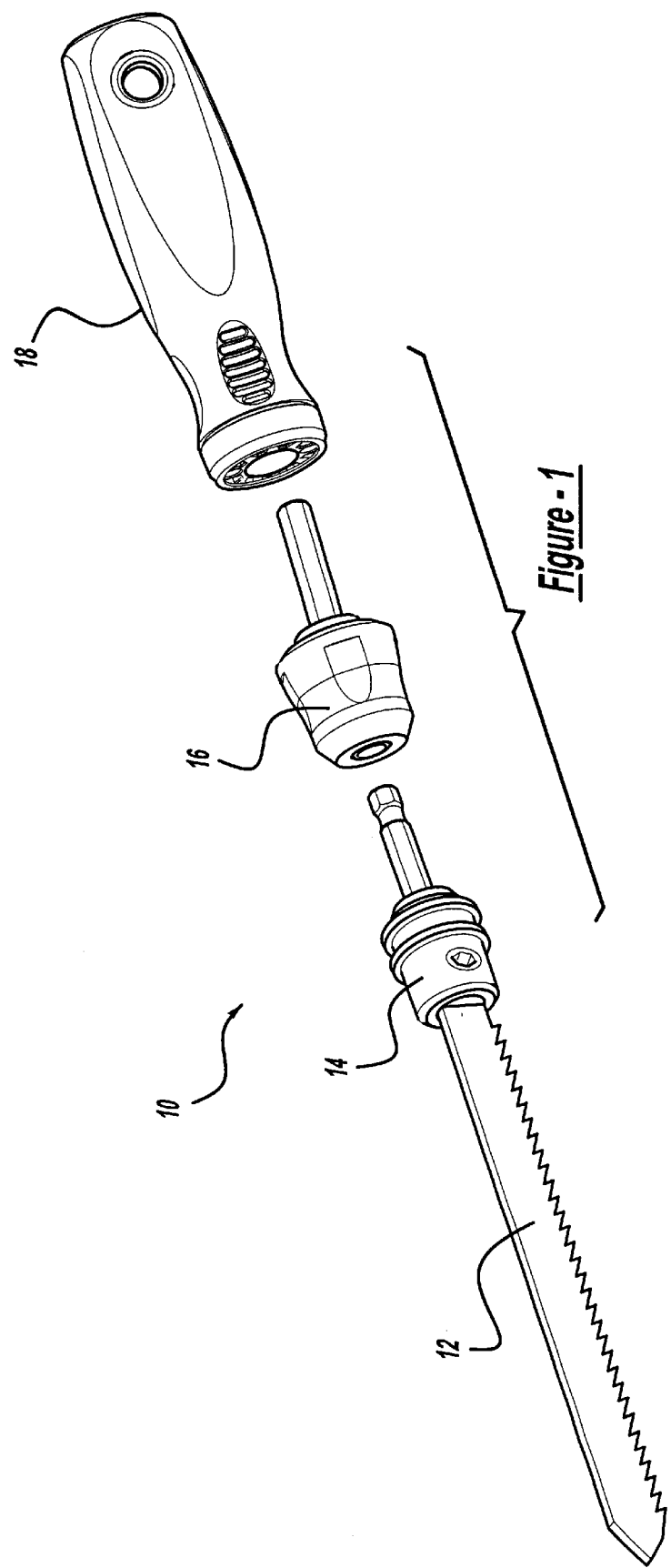
FIG. 1 is an exploded perspective view of the reciprocating saw having a set screw holder design, adapted for use in a hand held driver according to a first embodiment of the present invention.

With reference to the drawings, one embodiment of a reciprocating saw 10 is illustrated in FIG. 1 to generally include a saw blade 12 connected to a handle 18 of a hand held driver via a set screw holder 14 and a quick release bit holder 16. As is described in detail below, the saw blade 12 is connected to the set screw holder 14 which includes a connecting assembly at both ends to provide connection between the saw blade 12 and the bit holder 16. The bit holder 16 is coupled for rotation with the handle 18 and is configured to permit the operator to easily and securably connect the hand held driver 18 to the saw blade 12 for driving engagement in order to reciprocate the saw blade 12 to perform a cut. A preferred commercially available quick release bit holder is available under the trade name RAPID LOAD manufactured by Black and Decker Corporation, Towson, Md. It should be appreciated that other commercially available bit holders may also be used so long as the bit holder can permit easy and securable connection to the hand held driver 18. In addition, a quick release bit holder of the type illustrated herein is also more completely described in U.S. Pat. No. 6,053,675, issued Apr. 24, 2000, assigned to the assignee of the present application, and entitled "Quick-Acting Tool Bit Holder", the disclosure of which is herein incorporated by reference.

Figure 2:
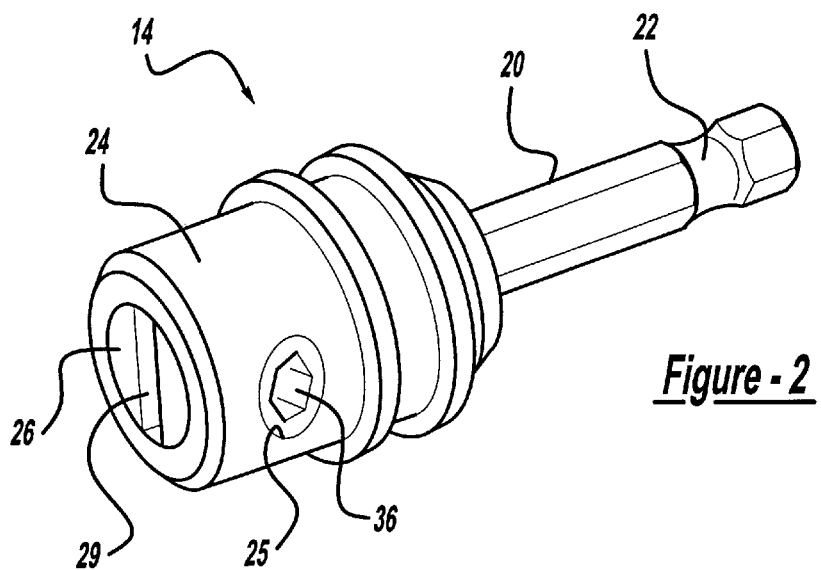
FIG. 2 is a perspective view of the set screw holder design, adapted for use in the reciprocating saw.
Figure 3A:
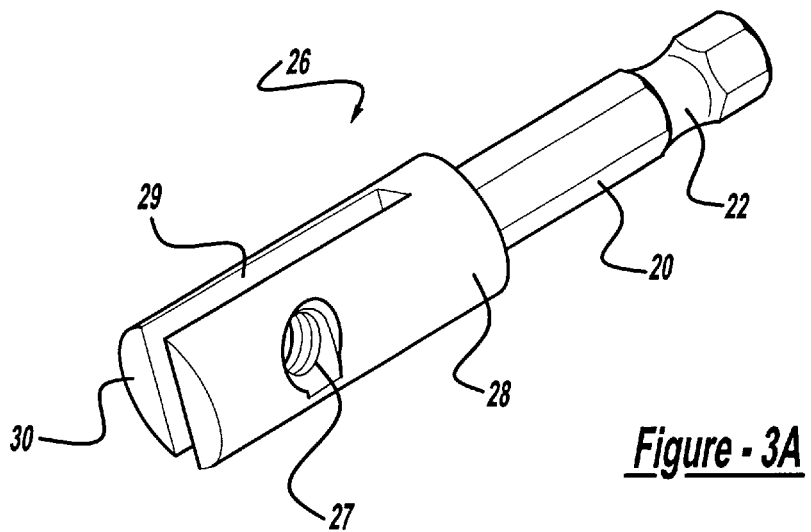
FIG. 3A is a perspective view of the cylinder, adapted for use in the set screw holder design of the reciprocating saw.
Figure 3B:
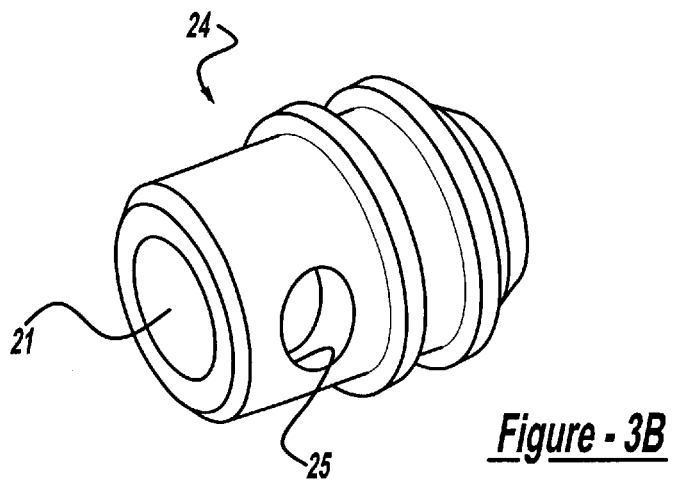
FIG. 3B is a perspective view of the sleeve, adapted for use in the set screw holder design of the reciprocating saw.

As is best illustrated in FIG. 2, the set screw holder 14 is configured to releasably hold the saw blade 12, and is connectable to the bit holder 16. The set screw holder 14 generally includes a cylinder portion 26 and a sleeve 24 as is best illustrated in FIGS. 3A and 3B, respectively. The cylinder portion 26 includes a body portion 28 and a shank 20 extending rearwardly from the rear end of the body 28 to provide a connection between the bit holder 16 and the set screw holder 14. The shank 20 is hex-shaped and includes a detent recess 22 for coupling the set screw holder 14 to the bit holder 16. The detent recess 22 of the shank 20 is engaged within the bit holder 16 in the operative position. An operator can pull back on the outer collar of the bit holder 16 to quickly release the shank 20 from the bit holder 16.

With reference to FIGS. 3A–B, a cylinder portion 26 and a sleeve 24 of set screw holder 14 are described in more detail. FIG. 3A illustrates the cylinder portion 26 having a body 28 and the shank 20. The body 28 includes a slot 29 extending rearwardly from a forward cylinder face 30 to accommodate the tail of the saw blade 12. Those skilled in the art will appreciate that the specific configuration may vary to accommodate different types and sizes of saw blades 12 without departing from the scope of the invention. FIG. 3B illustrates the sleeve 24 that is configured to cooperate with the outer surface of the body 28 of cylinder portion 26. The sleeve 24 has a length that is substantially the same as the body 28 of the cylinder portion 26, and an inner diameter that is substantially the same as the outer diameter of the body 28. The sleeve 24 further includes a smooth faced hole 25 on one side to receive a set screw 36 as shown in FIGS. 2 and 3C.

Figure 3C:
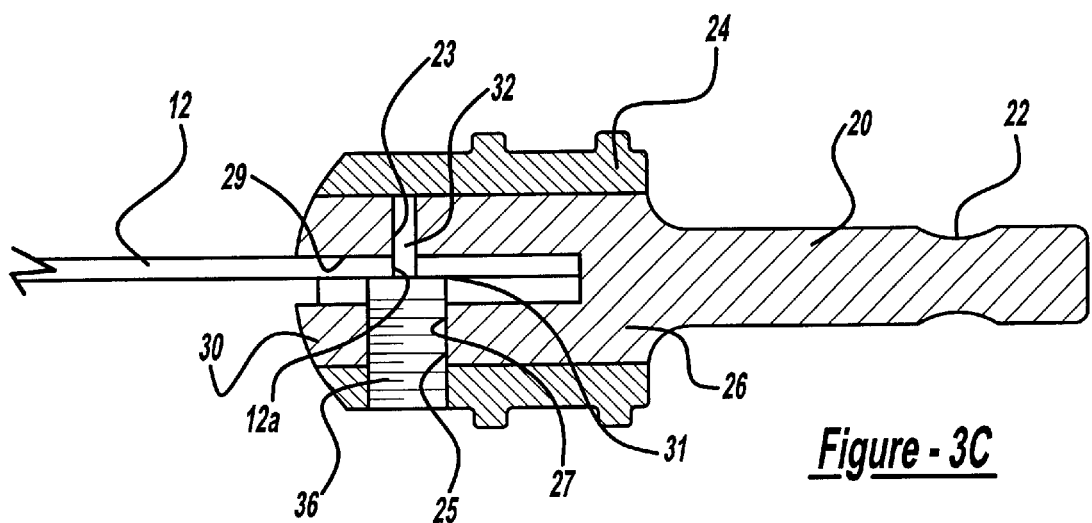
FIG. 3C is a sectional view of the set screw holder according to a first embodiment of the present invention adapted for use in the reciprocating saw.
Figure 3E:
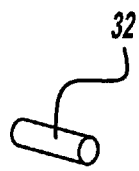
FIG. 3E is a perspective view of a pin for use in the set screw holder of FIG. 3C.
Figure 3D:
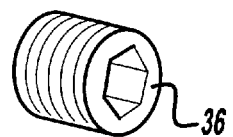
FIG. 3D is a perspective view of the set screw for use in the set screw holder of FIG. 3C.

Referring now to FIGS. 3C–3E of the drawings, the set screw holder 14 according to a first embodiment of the present invention is illustrated. The body 28 of the cylinder portion 26 includes a smooth faced aperture 23 disposed through one side of the body which opens to the slot 29. The cylinder 28 also includes a threaded radial aperture 27 disposed on the other face of the slot 29. The aperture 23 receives a pin 32 (FIGS. 3C, 3E) and the threaded radial aperture 27 receives a set screw 36 (FIGS. 3C, 3D). The pin 32 is also received in a hole 12a in the tail end of the saw blade 12. The sleeve 24 is slid over the body 28 of the cylinder portion 26 in order to maintain the pin 32 in the aperture 23. The set screw 36 is inserted through the hole 25 in the sleeve 24 and threadedly engaged with the threaded radial aperture 27 in the body 28 to secure the sleeve 24 in place. The set screw 36 is tightened so as to press the tail end of the saw blade 12 against a side wall of the slot 29. The saw blade 12 may be removed from the set screw holder 14 by drawing back the set screw 36, axially sliding the sleeve 24 to expose the pin 32 and removing the saw blade 12 from engagement with the pin 32.

Figure 4A:
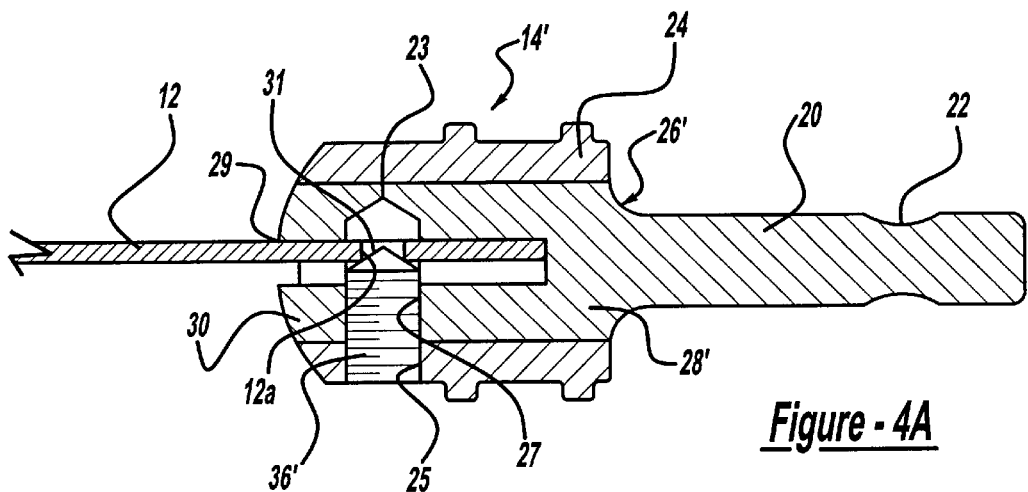
FIG. 4A is a sectional view of the set screw holder design according to a second embodiment of the present invention, adapted for use in the reciprocating saw.
Figure 4B:
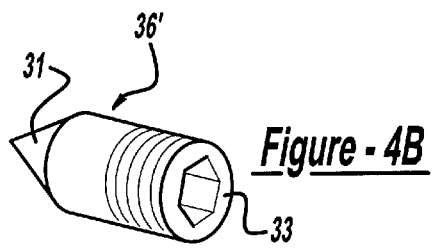
FIG. 4B is a perspective view of a set screw according to the second embodiment of the present invention, adapted for use in the set screw holder design of the reciprocating saw.

Referring now to FIGS. 4A–B of the drawings, a set screw holder 14' according to a slightly modified second embodiment of the present invention is illustrated wherein like reference numerals are used to designate the same or similar elements as described above. The body 28 of the cylinder portion 26' includes a smooth-faced tapped hole 23' disposed on one face of the slot 29. The cylinder 28' also includes a threaded radial aperture 27 disposed on the other face of the slot 29. The tapped hole 23' receives a conical end portion 32 (best shown in FIG. 4B) of set screw 36' and the radial aperture 27 receives a threaded portion 33 of set screw 36. The conical end portion 32 is brought into engagement with a hole 12a in the tail of the saw blade 12. The conical end portion 32 is configured to abut with the hole 12a of the saw blade 12 to pinch the saw blade against the side wall of slot 29. The set screw 36 is threaded and configured to cooperatively engage with the threaded radial aperture 27 of the cylinder 26.

As is best illustrated in FIG. 4A, the cylinder portion 26' is inserted into the bore 21 of the sleeve 24 which is generally circular in configuration. The cylinder portion 26' is rotationally aligned such that the radial aperture 27 aligns with the smooth faced hole 25 of the sleeve 24. To engage the saw blade 12 with the set screw holder 14, the set screw 36 is inserted through the smooth hole 25 of sleeve 24 and into the threaded aperture 27 of the cylinder portion 26 after insertion of the saw blade 12. The conical end 31 abuts the surface of the aperture 12a. The saw blade 12 may be removed from the set screw holder 14 by drawing back the set screw 36, allowing the conical end 31 to disengage from hole 12a and removing the saw blade 12 from engagement with the cylinder portion 26.

Figure 5A:
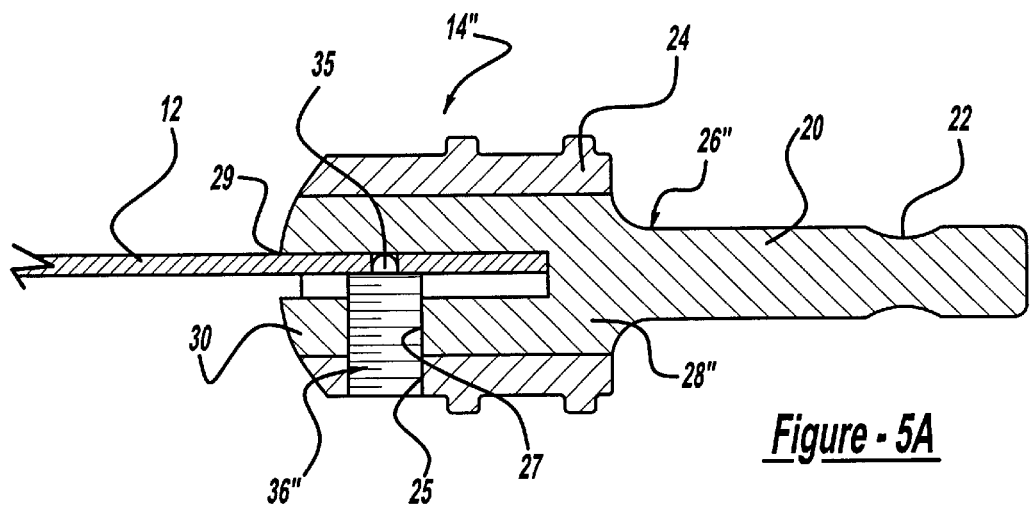
FIG. 5A is a sectional view of the set screw holder design according to a third embodiment of the present invention, adapted for use in the reciprocating saw.
Figure 5B:
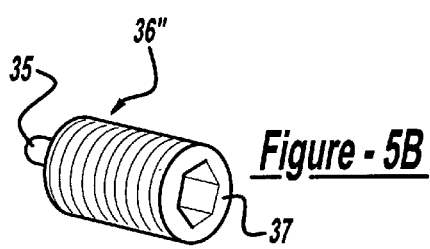
FIG. 5B is a perspective view of a set screw having an integral pin according to a third embodiment of the present invention, adapted for use in the set screw holder design of the reciprocating saw.

With reference to FIGS. 5A–B of the drawings, the set screw holder 14 according to a third embodiment of the present invention is described in more detail. The body portion 28" of the cylinder 26" includes a threaded radial aperture 27 disposed on one face of the slot 29 for receiving a set screw 36" as shown in FIG. 5B. The set screw 36" includes an integrally formed locating tip 35 having substantially the same radius as that of the hole 12a on the tail of the saw blade 12. The set screw 36" also includes a threaded end 37 for engaging with the threaded radial aperture 27 of the cylinder portion 26". To engage the saw blade 12 with the set screw holder 14, the cylinder portion 26" is inserted into the bore 21 of the sleeve 24, and the cylinder portion 26 is rotationally aligned so that the radial aperture 27 aligns with the smooth faced hole 25 of the sleeve 24. The saw blade 12 is placed into the slot 29 from the forward face 30 until the hole 12a in the tail of the saw blade 12 aligns with the radial aperture 27 of the cylinder 26. The set screw 36" is then inserted inwardly from the smooth faced hole 25 of the sleeve 24. The locating tip 35 of the set screw 36" is then located in the hole 12a of the tail of the saw blade 12 and the threaded end 37 provides support to hold the saw blade 12 in place against the side of slot 29. The saw blade 12 may be removed from the set screw holder 14 simply by unscrewing the set screw 36", and removing the saw blade 12 from engagement with the locating tip 35.

Figure 6:
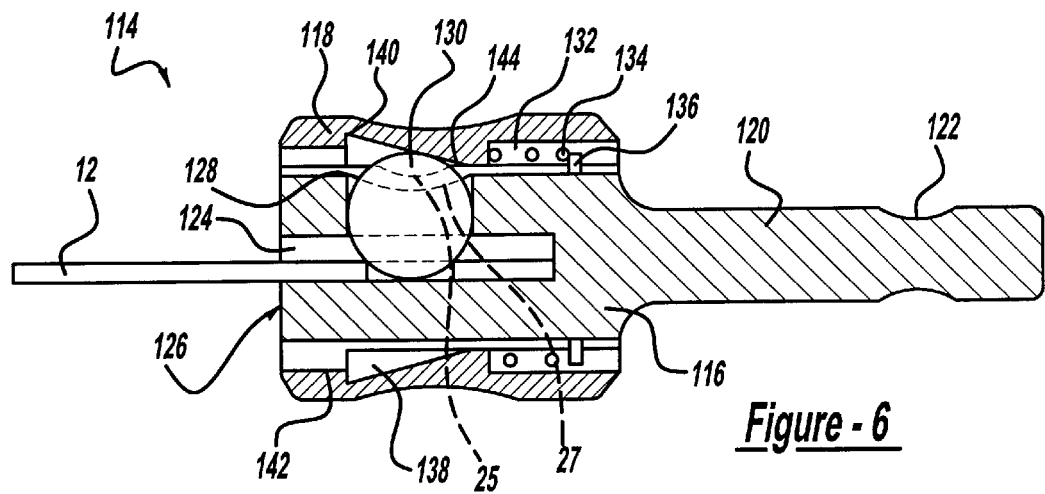
FIG. 6 is a sectional view of a ball type blade holder according to a fourth embodiment of the present invention adapted for use in the reciprocating saw.

With reference to FIG. 6 of the drawings, a ball-type blade holder 114 according to a fourth embodiment of the present invention is illustrated. The ball-type blade holder 114 generally includes a cylinder portion 116, and a collar 118. As described above, the cylinder portion 116 includes a hex-shaped shank 120 having a detent 122 for engaging with a bit holder 16 described above. The cylinder portion 116 further includes a slot 124 extending rearwardly from the forward face 126, and a radial aperture 128 extending through to one face of the slot 124. A ball 130 having a slightly smaller diameter than that of the radial aperture 128 is placed in the radial aperture 128, and a portion of the ball 130 extends into the slot 124 in its engaged position. The collar 118 includes a chamber 132 near a rearward face of the cylinder portion 116 for accommodating a spring 134 and a spring clip 136. Collar 118 also includes an enlarged inner cavity 138 for allowing radial movement of the ball 130. The enlarged cavity 138 is configured to form a ramp 140 which terminates at an inwardly extending flange 142 of the collar 118 when assembled in order to define a passage for the ball 130. The spring clip 136 is disposed near the rear end of the sleeve for retaining the spring 134 in the chamber 132, and the spring 134 is placed in the passage defined by the spring clip 136 and the chamber 132 for biasing the collar 118 to an engaged position.

For engaging the saw blade 12 with the ball-type blade holder 114, the collar 118 is pushed rearwardly against the spring force, so that the forward end 142 of the enlarged cavity 138 is aligned with the ball 130. The ball 130 is then free to move radially outward in the enlarged cavity 138 allowing the saw blade 12 to be inserted in the slot 124 of the cylinder portion 116. After the insertion of the saw blade 12, the ball 130 is locked in the rear end 144 of the enlarged cavity 138 with a portion of the ball 130 extending into the hole 12a formed in saw blade 12. The extending portion of the ball 130 retains the saw blade 12 for resisting inadvertent or unintended removal of the saw blade 12 in its engaged position. The spring 134 keeps the collar 118 pushed forward, and the narrow portion of the ramp 140 in the enlarged cavity 138 of collar 118 retains the ball 130 in place. Similarly, the saw blade 12 may be removed from the ball-type blade holder 114 simply by pulling back the collar 118 and removing the saw blade 12 since the ball 130 is allowed to disengage from the hole 12a.

Turning now to FIG. 7 of the drawings, a fifth embodiment of the reciprocating saw 50 is illustrated to generally include the saw blade 12 connected to the handle 18 of the hand held driver via the bit holder 16 and a die cast holder 52. The bit holder 16 and hand held driver 18 are of the types described in more detail in the description of the previous embodiments. Those skilled in the art will appreciate that other types of bit holders and hand held drivers may be used to accommodate different types of saw blades 12 without departing from the scope of the present invention.

Figure 8:
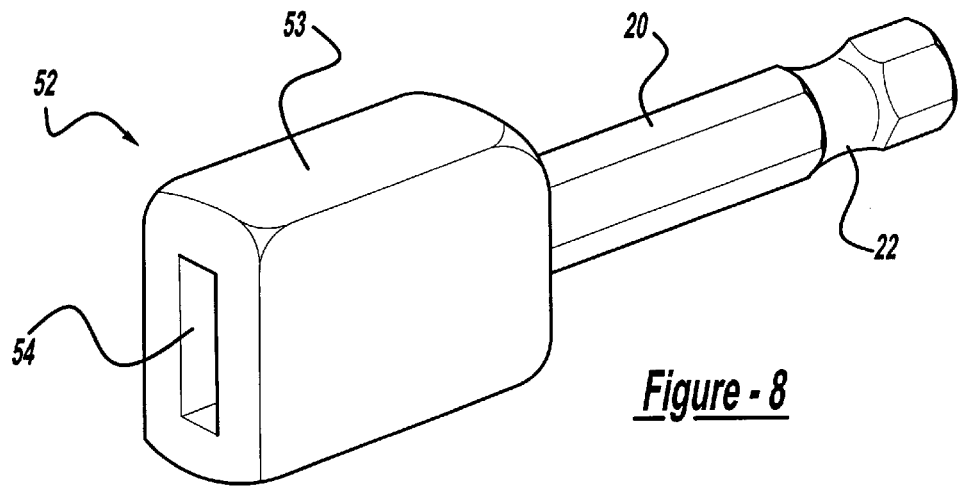
FIG. 8 is a perspective view of the die cast holder, adapted for use in the reciprocating saw.

FIG. 8 illustrates the die cast holder 52 (with the blade 12 removed for clarity) having a body 53 and a shank 20 extending rearwardly from the body 53 to provide connection between the bit holder 16 and the die cast holder 52. The shank 20 is hex-shaped and includes a detent recess 22 for releasably coupling the die cast holder 52 to the bit holder 16. The detent recess 22 permits the operator to purposefully remove the die cast holder from its engaged position with the bit holder 16. When the detent recess 22 is in the operative position, the bit holder 16 retains the detent recess 22 of the shank 20 against axial engagement. In this embodiment of the present invention, the saw blade 12 is cast permanently in slot 54 which is shown in FIG. 8 wherein the saw blade 12 has been removed for clarity. Several saw blades with different sizes and types may be cast within a die cast holder 52 in one standard die 53 having a size and weight suitable for accommodating various types of saw blades 12. Thus, the die cast reciprocating saw 50 allows the user to switch quickly from one saw blade to the next when needed.

Figure 9:
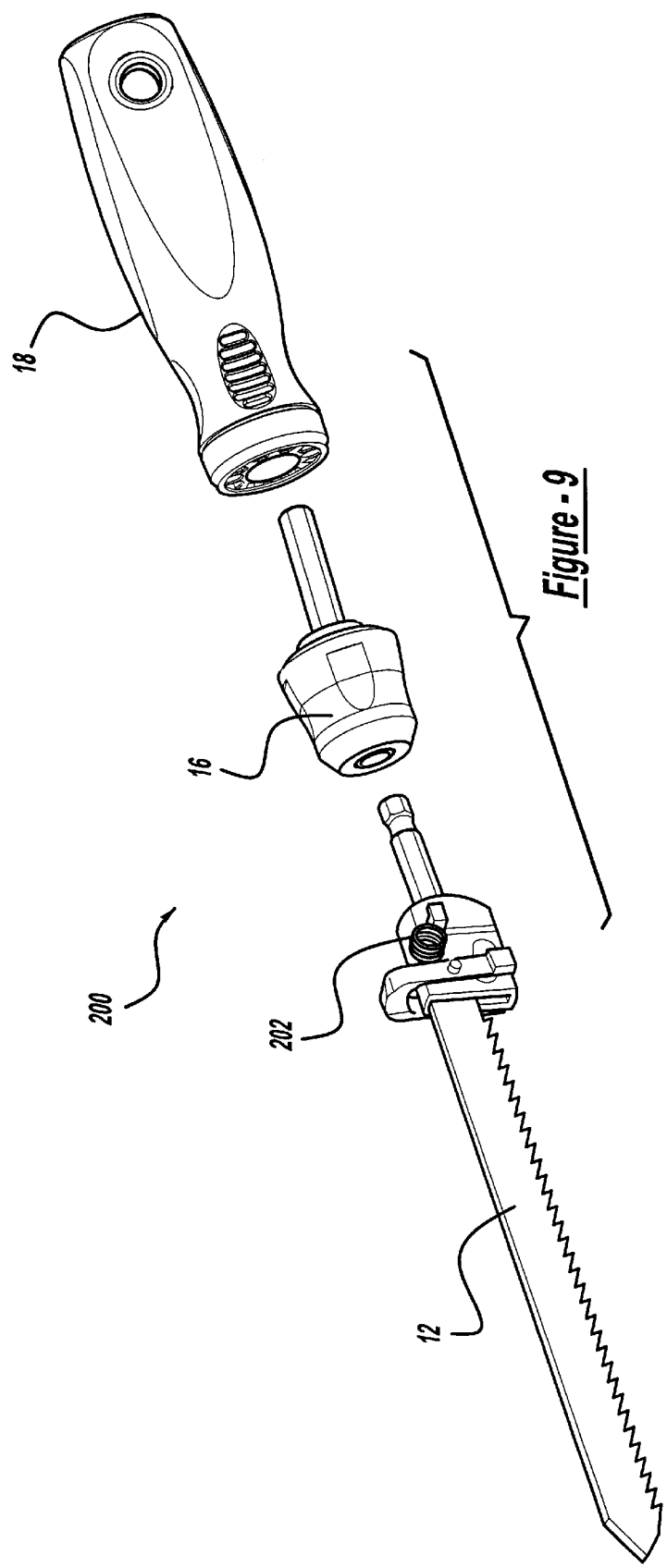
FIG. 9 is an exploded perspective view of the reciprocating saw having a spring clamp holder, adapted for use in a hand held driver according to a sixth embodiment of the present invention.

With reference to FIG. 9, a sixth embodiment of the reciprocating saw 200 is illustrated to include the saw blade 12 connected to the handle 18 of the hand held driver via the bit holder 16 and a clamp holder 202. As is described in detail below with respect to FIG. 10, the tail of the saw blade 12 is connected to the forward end of the clamp holder 202 with a clamp assembly 205 providing secure connection to the saw blade 12. The rear end of the clamp holder 202 is connected to the bit holder 16 via the hex-shaped shank 20 having a detent recess 22 shown in FIG. 10. The detent recess 22 permits the operator to retain the clamp holder 202 within the bit holder 16. The bit holder 16 is coupled to the handle 18 of the hand held driver. A more detailed description of the bit holder and the hand held driver are given in the aforementioned references.

Figure 10:
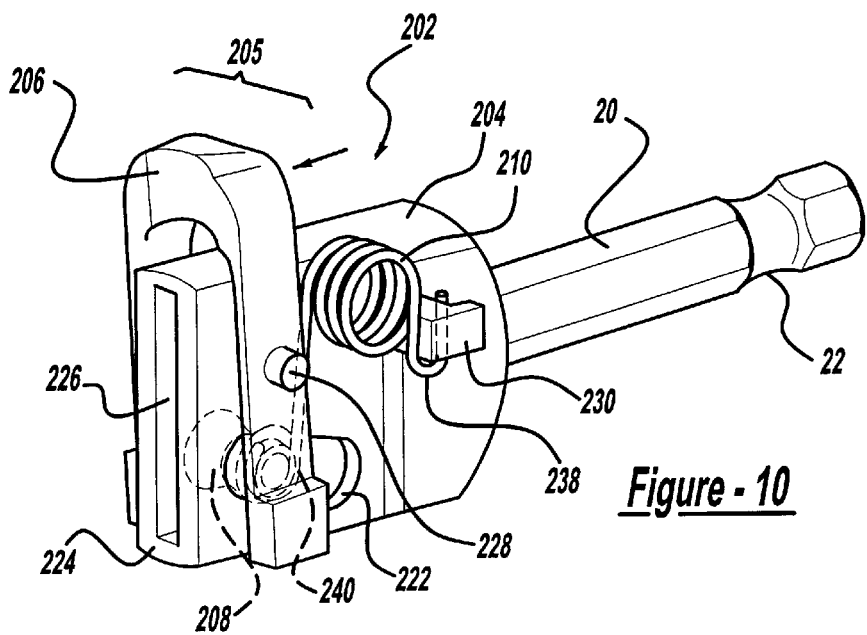
FIG. 10 is a perspective view of the spring clamp holder having a clamp assembly, adapted for use in the reciprocating saw.
Figure 11:
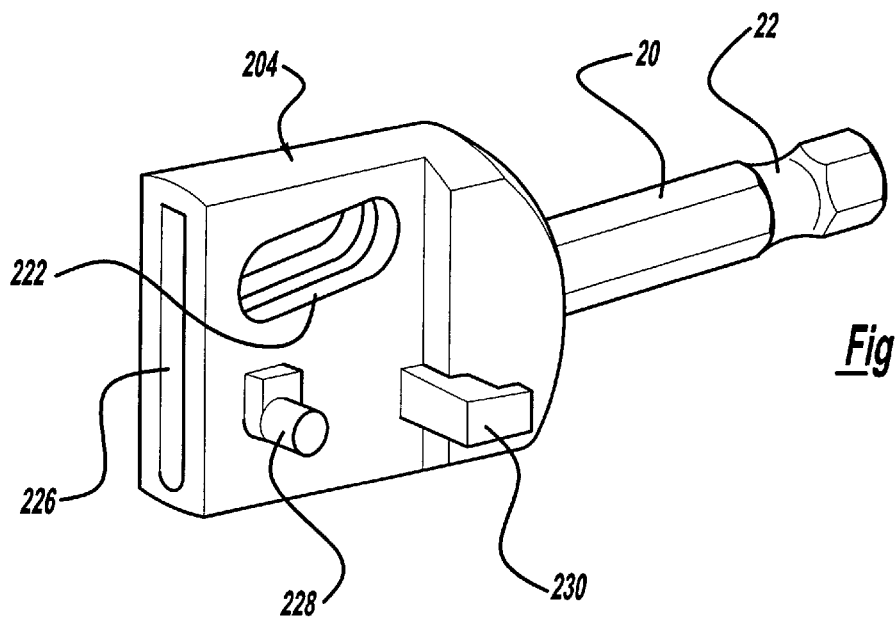
FIG. 11 is a perspective view of the body of the spring clamp holder, adapted for use in the reciprocating saw.

FIG. 10 shows a perspective view of the clamp holder 202 to include a body 204 and the clamp assembly 205. As briefly mentioned above, the clamp holder 202 is configured to accommodate the saw blade 12 at one end and has a shank 20 which engages the bit holder 202 at the other end. The body 204 is cast around the rearwardly extending hex-shaped shank 20. As is described below, each side of body 204 includes a pivot mount 228, a spring mount 230 and an angled slot 222 for accommodating the clamp assembly 205. As is best illustrated in FIG. 11, the body 204 further includes a slot 226 extending rearwardly from a forward face 224 of the body 204. The slot 226 is configured to receive the tail of the saw blade 12. Those skilled in the art would appreciate that the width and length of the slot 226 may be varied to accommodate various types of saw blades with different sizes and shape.

With reference to FIGS. 12, 13, and 14A–C, each part of the clamp assembly 205 is described in detail below. The clamp assembly 205 is coupled to the body 204 of the clamp holder 202 for movement between a clamped position and a released position for releasably coupling the saw blade 12 to the clamp holder 202. More particularly, the clamp assembly 205 generally includes a lever 206, a roller 208 and a pair of biasing springs 210.

Figure 12:
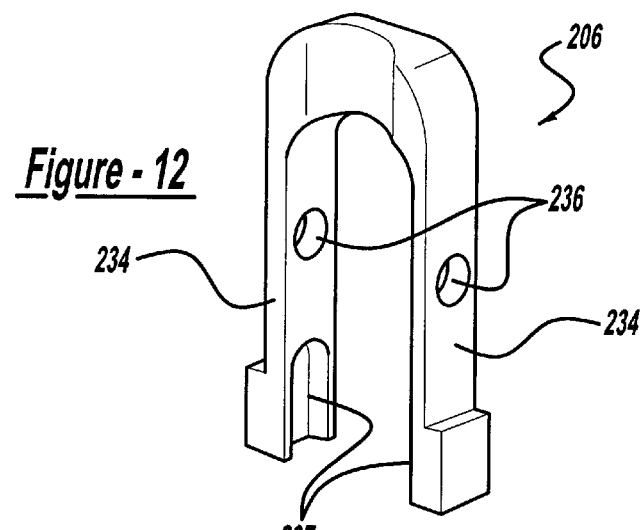
FIG. 12 is a perspective view of the lever of the spring clamp assembly, adapted for use in the spring clamp holder of the reciprocating saw.

FIG. 12 illustrates the U-shaped lever 206 of the clamp assembly 205 to include a pair of opposed legs 234 having apertures 236. Each of the radial apertures 236 are disposed generally at the midpoint of each of the legs, so as to provide connection between the lever 206 and the pivot mounts 228 of the body 204 of the clamp holder 202. The pair of apertures 236 allow the lever 206 to pivot about the pivot mounts 228 disposed on the body 104. The lever 206 further includes a pair of U-shaped slots 237 formed at the tips of the legs 234. The U-shaped slots 237 permit the ends 233 of the roller 208 to easily engage with the lever 206 by sliding into the slots 237.

Figure 13:
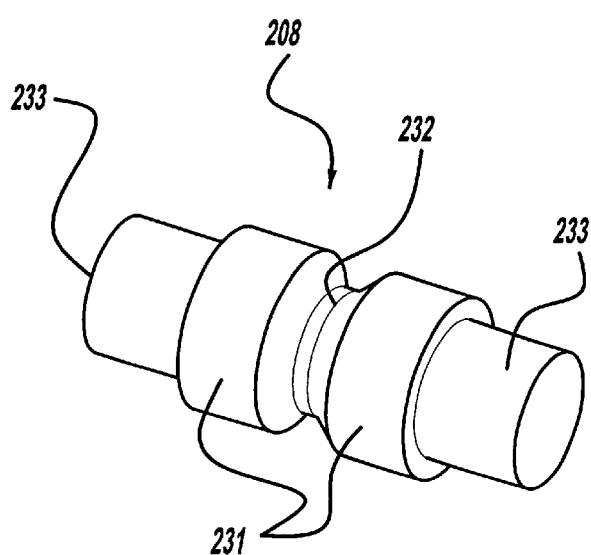
FIG. 13 is a perspective view of the pin of the spring clamp assembly, adapted for use in the spring clamp holder of the reciprocating saw.

Turning now to FIG. 13 of the drawings, the roller 208 is illustrated to generally include a pair of outer ends 233 integrated with both ends of the intermediate body portion 231 having a groove 232 at its midpoint. The intermediate body portion 231 has a diameter slightly less than that of the angled slots 222 so as to allow the roller 208 to ride therein, and has a width that is substantially the same as that of the body 204 of the clamp holder 202. The outer ends 233 have a smaller diameter than that of the intermediate body portion 231, and are engaged by the biasing springs 210. The groove 232 has a width that is substantially the same as that of the slot 226, and cooperatively retains the tail of the saw blade 12.

Figure 14A:
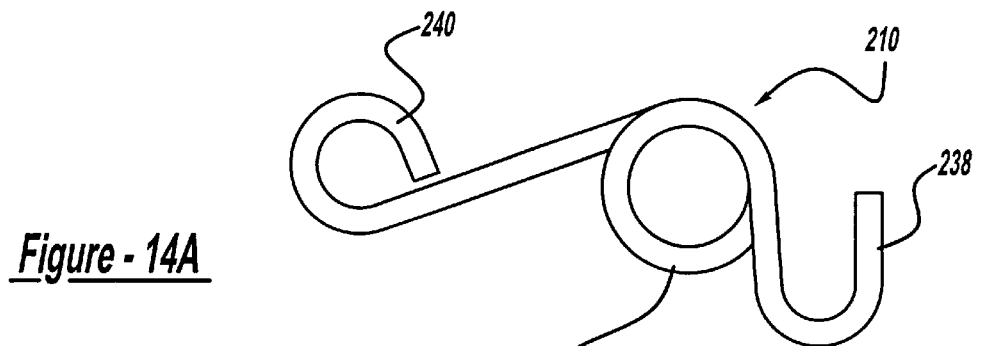
FIGS. 14A–C are front views depicting the free, bottom, and top positions, respectively, of the spring of the clamp assembly, adapted for use in the reciprocating saw according to the present invention.
Figure 14B:
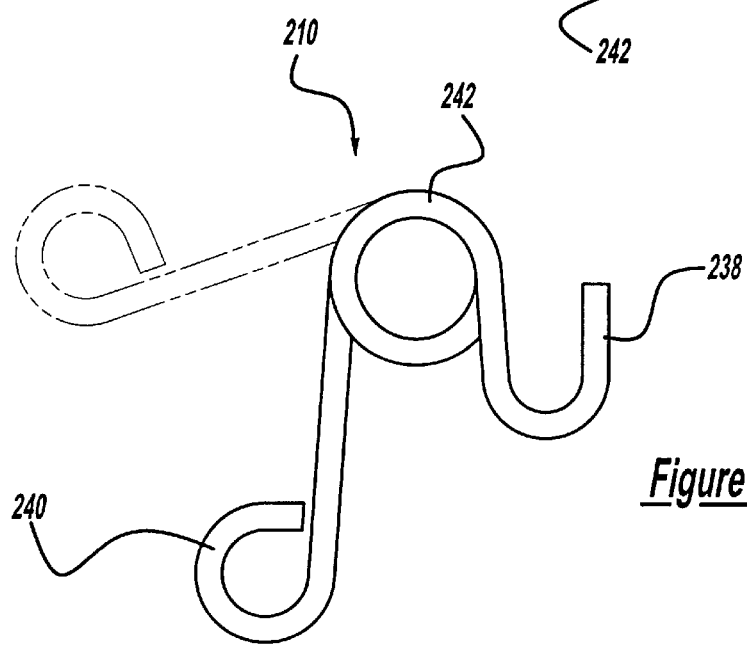
Figure 14C:
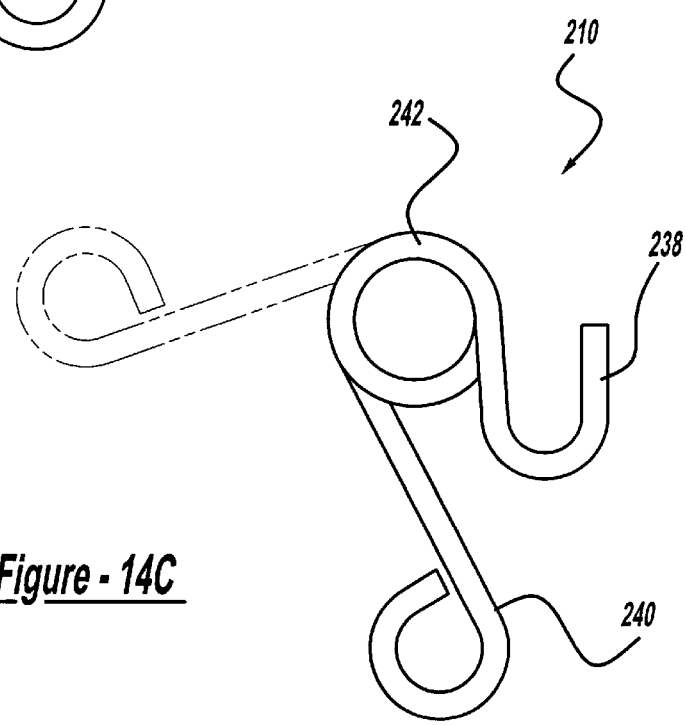

With particular reference to FIGS. 14A–C of the drawings, the biasing spring 210 is illustrated in detail to show three different angular positions of the biasing spring 210 depending on the location of the lever 206 of the clamp assembly 205. The spring 210 includes a hook portion 238 formed at one end of the coiled portion 242, and a looped portion 240 formed at the other end of the coiled portion 242. The looped portion 238 is secured over the spring mount 230 formed on the body 204. The looped portion 240 is secured over the outer ends 233 of the roller 208 for biasing the roller 208 toward a forward engaged position within the angled slot 222.

FIG. 14A shows the biasing spring 210 in its free position. FIG. 14B shows the biasing spring 210 in its mounted position within which the looped portion 240 presses the roller 208 in a forward direction along the angled slots 222. In this embodiment, a spring force of approximately 8 Newton (N) is applied to the looped portion 240, and the looped portion 240 is shifted inwardly about 67.2 degrees from its free position (shown in phantom). FIG. 14C shows the biasing spring 210 in its rearward released position within which the looped portion 240 is pressed rearwardly by pivoting the upper portion of lever 106 forward. In this embodiment, a force of approximately 12.5 Newton (N) is applied to the looped portion 240, and the looped portion 240 is shifted inwardly about 97.6 degrees from its free position (shown in phantom). Those skilled in the art would appreciate that the force and the angle described above may be varied to accommodate different types of biasing springs and different types of saw blades.

Referring now back to FIG. 10 of the drawings, the clamp assembly 205 is coupled to the body 204 of the clamp holder 202 for movement between a clamped position and a released (free) position for releasably coupling the saw blade 12 to the clamp holder 202. The roller 208 is biased by the pair of springs 210 via the lever 206 to engage the bottom surface of the tail of the saw blade 12. The roller 208 in association with the biasing spring 210 and the lever 206, urges the tail of the saw blade 12 against the upper surface of slot 226 of the body 204 when the clamp assembly 205 is in its engaged position. More particularly, the roller 208 rides in the, angled slots 222 in the body 204 such that the groove 232 in the roller 208 clamps the saw blade 12 to the clamp holder 202. The operator can move the roller 208 to its disengaged position through forward pivoting movement of the upper portion of lever 206 about the first mount 228. As the lever 206 is pressed forward, the legs 234 of the lever 206 move rearwardly along with roller 208. As roller 208 moves along angled slots 222, the roller 208 disengages from the tail of the saw blade 12.

From the above description, it should be appreciated that the reciprocating saw 10, 50, 114, and 200 of the present invention is adapted for use in association with the hand held driver 18. In addition, the various embodiments of the set screw holder 14, the ball-type holder 114, the die cast holder 52, and the clamp holder 202 are configured to easily and securely switch saw blades from application to application. Therefore, the present invention would allow the operator to be more versatile on the job site when more than one handsaw is needed.

The foregoing discussion discloses and describes merely exemplary embodiments of the present invention. One skilled in the art will readily recognize from such discussion, and from the accompanying drawings and claims, that various, changes, modifications and variations can be made therein without departing the spirit and scope of the invention as defined in the following claims.

What is claimed is:

1. A blade holder for providing connection between a saw blade and a bit holder, comprising:

a holder body adapted for providing connection to the saw blade at the forward end of the blade holder; and a hex-shaped shank extending rearwardly from the holder body for coupling the blade holder to the bit holder;

wherein the holder body includes a cylinder having a slot for receiving a saw blade therein and a collar slidably disposed on said cylinder, said collar having an internal ramp surface which is engaged by a ball disposed in an aperture in one side of said cylinder, said ball being forced by said ramp surface toward said slot in its engaged position for engaging said saw blade in said slot.

2. The blade holder of claim 1, wherein said collar is slidable against a biasing force to allow the ramp surface of said collar to disengage said ball and allow the saw blade to be removed.

3. The blade holder of claim 2, wherein a spring is placed in a chamber defined by the collar for biasing the collar to an engaged position.

4. A blade holder for providing connection between a saw blade and a bit holder, comprising:

a holder body adapted for providing connection to the saw blade at the forward end of the blade holder; and a hex-shaped shank extending rearwardly from the holder body for coupling the blade holder to the bit holder;

wherein the blade holder further comprises a clamp assembly being coupled to the holder body for movement between first and second positions for releasably coupling the saw blade to the holder.

5. The blade holder of claim 1, wherein said ball is adapted to engage a hole in said saw blade when in its engaged position.

6. The blade holder of claim 4, wherein the holder body includes a pair of angled guide slots in opposite sides of the holder body, a pair of pivot mounts and a pair of spring mounts on said sides of the holder body, and a slot extending rearwardly from the forward end of said holder body for receiving a tail of the saw blade, said clamp assembly includes a roller inserted into the pair of angled slots of the holder body, a lever having a pair of legs pivotally mounted tdo said pair of pivot mounts and connected to ends of said roller, and a pair of springs mounted to said pair of spring mounts for biasing the roller toward an engaged position for engaging said tail of said saw blade, said roller being movable abong said angled slots to a disengaged position for disengaging the saw blade when said lever of said clamp assembly is pushed toward a disengaged position.

* * * * *